United States Patent
Choi et al.

(10) Patent No.: US 10,244,035 B2
(45) Date of Patent: Mar. 26, 2019

(54) METHOD AND APPARATUS FOR FILE TRANSFER

(71) Applicant: Samsung Electronics Co., Ltd., Gyeonggi-do (KR)

(72) Inventors: Sung Jin Choi, Gyeonggi-do (KR); Hyun Gyoo Yook, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 423 days.

(21) Appl. No.: 14/834,693

(22) Filed: Aug. 25, 2015

(65) Prior Publication Data

US 2016/0057200 A1 Feb. 25, 2016

(30) Foreign Application Priority Data

Aug. 25, 2014 (KR) .................. 10-2014-0110601

(51) Int. Cl.
*G06F 15/16* (2006.01)
*H04L 29/08* (2006.01)

(52) U.S. Cl.
CPC .............. *H04L 67/06* (2013.01); *H04L 67/36* (2013.01)

(58) Field of Classification Search
CPC ................................ H04L 67/06; H04L 67/36
USPC ........................................................ 709/217
See application file for complete search history.

(56) References Cited

U.S. PATENT DOCUMENTS

| | | | | |
|---|---|---|---|---|
| 6,742,023 B1* | 5/2004 | Fanning | ............ | G06F 17/30194 707/E17.032 |
| 6,850,962 B1* | 2/2005 | Povolny | ............ | G06F 17/30176 709/203 |
| 6,907,463 B1* | 6/2005 | Kleinpeter, III | ........ | H04L 67/06 709/204 |
| 2003/0028610 A1* | 2/2003 | Pearson | ............ | G06F 17/30206 709/213 |
| 2005/0149508 A1* | 7/2005 | Deshpande | ....... | G06F 17/30091 |
| 2014/0013238 A1 | 1/2014 | Jin et al. | | |
| 2014/0157300 A1* | 6/2014 | Childs | ................ | H04N 21/2396 725/25 |
| 2015/0227549 A1* | 8/2015 | Moon | ............... | G06F 17/30091 707/827 |

* cited by examiner

*Primary Examiner* — Wing F Chan
*Assistant Examiner* — Joseph R Maniwang
(74) *Attorney, Agent, or Firm* — Cha-Reiter, LLC.

(57) ABSTRACT

An electronic device comprising: a communication module; and at least one processor configured to: receive, via the communication module, a respective file list of each of a plurality of external electronic devices; designate a target file based on the file list, a first external electronic device from the plurality as a source electronic device and a second external electronic device from the plurality as a target electronic device; and transmit, via the communication module, a file transfer message to the target electronic device, wherein the file transfer message comprises an instruction to retrieve a target file from the source electronic device.

19 Claims, 7 Drawing Sheets

METHOD AND APPARATUS FOR FILE TRANSFER

CLAIM OF PRIORITY

This application claims the benefit under 35 U.S.C. § 119(a) of a Korean patent application filed on Aug. 25, 2014 in the Korean Intellectual Property Office and assigned Serial number 10-2014-0110601, the entire disclosure of which is hereby incorporated by reference.

TECHNICAL FIELD

The present disclosure relates to electronic devices, and more particularly to a method and apparatus for file transfer.

BACKGROUND

With the development of electronic technologies, various types of electronic devices are spread. There are many cases in which one user uses several electronic devices. Therefore, there is a growing need for sharing contents (e.g., photos, music, videos, documents, and the like) between the several electronic devices used by the user.

Therefore, technologies for sharing contents of several devices through a server, such as a webhard or a cloud service, are developed. To directly share contents between electronic devices without a server, a user connects electronic devices in a wired or wireless manner to transmit contents.

As described above, to transmit and receive contents between electronic devices, the user should directly have the electronic devices to transmit and receive the contents. Therefore, when the user does not currently have an electronic device which stores contents to be shared, he or she may not share the contents.

SUMMARY

According to aspects of the disclosure, an electronic device is provided comprising: a communication module; and at least one processor configured to: receive, via the communication module, a respective file list of each of a plurality of external electronic devices; designate a target file based on the file list, a first external electronic device from the plurality as a source electronic device and a second external electronic device from the plurality as a target electronic device; and transmit, via the communication module, a file transfer message to the target electronic device, wherein the file transfer message comprises an instruction to retrieve a target file from the source electronic device.

According to aspects of the disclosure, a method is provided comprising: receiving, by at least one processor, a respective file list of each of a plurality of external electronic devices; designating a target file based on the file list, a first external electronic device from the plurality as a source electronic device and a second external electronic device from the plurality as a target electronic device; and transmitting, by a communications module, a file transfer message to the target electronic device, wherein the file transfer message comprises an instruction to retrieve a target file from the source electronic device.

According to aspects of the disclosure, a non-transitory computer-readable medium storing a plurality of processor-executable instructions which when executed by at least one processor cause the processor to perform a method comprising: receiving a respective file list of each of a plurality of external electronic devices; designating a target file based on the file list, a first external electronic device from the plurality as a source electronic device and a second external electronic device from the plurality as a target electronic device; and transmitting a file transfer message to the target electronic device, wherein the file transfer message comprises an instruction to retrieve a target file from the source electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Hereinafter, the present disclosure is described with reference to the accompanying drawings. Various modifications are possible in various embodiments of the present disclosure. Specific embodiments are illustrated in drawings and related descriptions are listed. However, the present disclosure is not intended to be limited to the specific embodiments, and it is understood that it should include various modifications, equivalents, and/or alternatives according to various embodiments of the present disclosure. With respect to the descriptions of the drawings, like reference numerals refer to like elements.

In the disclosure disclosed herein, the expressions "include" and "comprise" or "may include" and "may comprise" used herein indicate existence of disclosed corresponding functions, operations, or elements but does not exclude additional one or more functions, operations, or elements. Also, it should be further understood that the term "include", "comprise", "have", "including", "comprising", or "having" used herein specifies the presence of stated features, integers, operations, elements, components, or combinations thereof but does not preclude the presence or addition of one or more other features, integers, operations, elements, components, or combinations thereof.

In the disclosure disclosed herein, the expressions "A or B" and the like used herein may include any and all combinations of one or more of the associated listed items. For example, the term "A or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements but do not limit the corresponding elements. For example, the expressions do not limit the order and/or priority of the corresponding elements. The expressions may be used to distinguish one element from another element. For instance, both "a first electronic device" and "a second electronic device" indicate electronic devices and different electronic devices. For example, a first component may be referred to as a second component and vice versa without departing from the scope of the present disclosure.

It will be understood that when an element is referred to as being "coupled with/to" or "connected to" another element, it can be directly coupled with/to or connected to the other element or an intervening element may be present. In contrast, when an element is referred to as being "directly coupled with/to" or "directly connected to" another element, it should be understood that there are no intervening elements.

Terms used in various embodiments of the present disclosure are used to describe specified embodiments of the present disclosure and are not intended to limit the scope of the present disclosure. The terms of a singular form may include plural forms unless otherwise specified.

Unless otherwise defined herein, all the terms used herein, which include technical or scientific terms, may have the same meaning that is generally understood by a person skilled in the art.

It will be further understood that terms, which are defined in a dictionary and commonly used, should also be interpreted as is customary in the relevant related art. Unless expressly so defined herein in various embodiments of the present disclosure, the terms are not in an idealized or overly formal detect.

Figure 1:
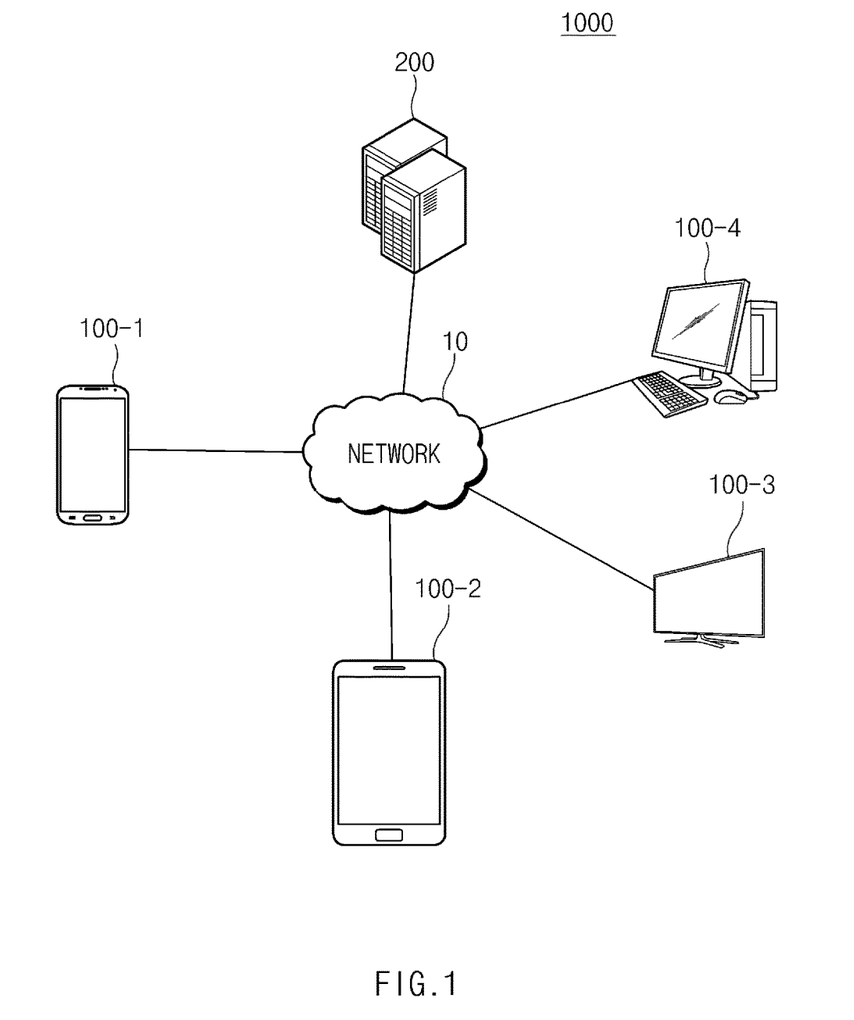
FIG. 1 is a diagram of an example of a file transfer system according to an embodiment of the present disclosure.

FIG. 1 is a diagram of an example of a file transfer system according to an embodiment of the present disclosure.

Referring to FIG. 1, a file transfer system 1000 may include a plurality of electronic devices 100-1 to 100-4, and a server 200.

The plurality of electronic devices 100-1 to 100-4 and the server 200 may be connected to each other through a network 10. According to an exemplary embodiment of the present disclosure, the network 10 may be a mobile communication network (e.g., a long-term evolution (LTE) network, a 3 generation (3G) network, and the like) or the Internet network.

According to an exemplary embodiment of the present disclosure, the plurality of electronic devices 100-1 to 100-4 may include various electronic devices such as smartphones, smart televisions (TVs), tablet personal computers (PCs), notebook PCs, cameras, and desktop PCs. According to an exemplary embodiment of the present disclosure, the plurality of electronic devices 100-1 to 100-4 may be different from each other. Although in the present example the file transfer system 1000 includes four devices, it will be appreciated that the file transfer system 1000 may include any suitable number of devices.

An application, which may control file transfers between the plurality of electronic devices 100-1 to 100-4, may be stored or installed in each of the plurality of electronic devices 100-1 to 100-4. A user may use the application to control a file transfer or find a file transfer state.

Each of the plurality of electronic devices 100-1 to 100-4 may be registered in a file transfer service using the application. According to an embodiment of the present disclosure, each of the plurality of electronic devices 100-1 to 100-4 may register an identifier corresponding to that device (e.g., a mobile station integrated system digital number (MSISDN), an email address, or or a user identifier (ID)) in a file transfer service registration process. According to an embodiment of the present disclosure, electronic devices which are owned by one user may use a file transfer service therebetween. According to an embodiment of the present disclosure, each of the plurality of electronic devices 100-1 to 100-4 may transmit particular device information such as its media access media (MAC) address and its internet protocol (IP) address to the server 200 in the file transfer service registration process and may receive device information of another electronic device from the server 200.

The plurality of electronic devices 100-1 to 100-4 may share their respective file lists, indications of their respective file transfer environments, or indications their respective file transfer states with each other. The file list of a given device may include information about at least one of a file name, a file size, an extension, or a contents type of a file stored on that device. The indication of the transfer environment of a given device may identify at least one of a type of a network which the device is connected to, a transfer rate of the network, or a battery state of each of the plurality of electronic devices 100-1 to 100-4. The indication of the file transfer state may indicate at least one of a transfer rate, a transfer quantity, a transfer progress ratio, whether to progress a transfer, a total estimated time, or a remaining time.

According to an embodiment of the present disclosure, each of the plurality of electronic devices 100-1 to 100-4 may transmit its file list to another electronic device and may receive a file list of the other electronic device.

According to an embodiment of the present disclosure, the plurality of electronic devices 100-1 to 100-4 may share mutual file lists through the server 200. For example, each of the plurality of electronic devices 100-1 to 100-4 may transmit its file list to the server 200 and may receive a file list of another electronic device from the server 200.

A user of the plurality of electronic devices 100-1 to 100-4 may control or manage file transmission and reception of the other electronic devices using one of the plurality of electronic devices 100-1 to 100-4. Each of the plurality of electronic devices 100-1 to 100-4 may be a management electronic device, a source electronic device, or a target electronic device depending on the situation. For example, the user may transfer a file from the third electronic device 100-3 or the fourth electronic device 100-4 to the second electronic device 100-2 using the first electronic device 100-1. In this example, the first electronic device 100-1 may be a management electronic device, and the second electronic device may be a target electronic device. The third electronic device 100-3 or the fourth electronic device 100-5 may be a source electronic device.

Figure 2:
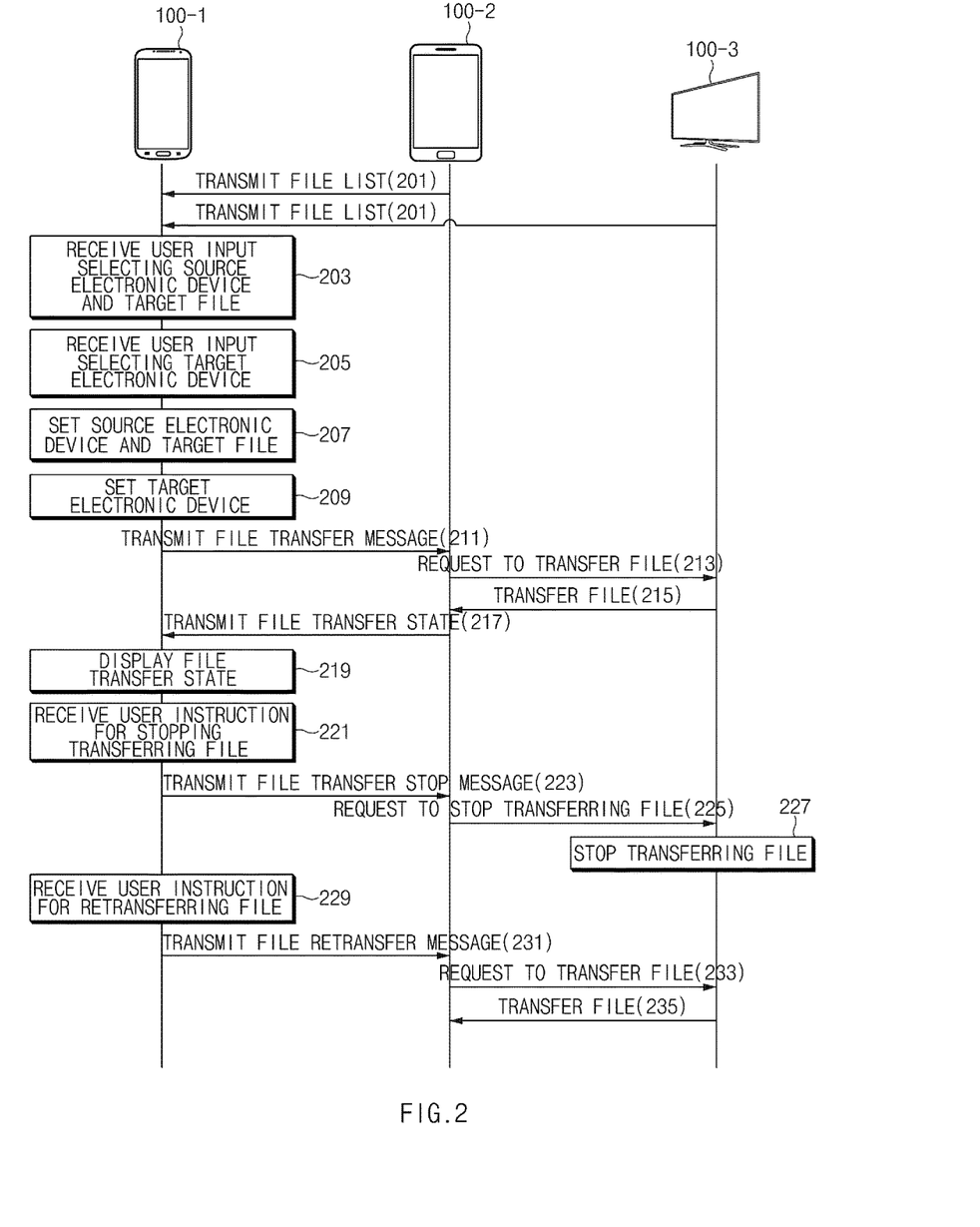
FIG. 2 is a sequence diagram of an example of a process according to various embodiments of the present disclosure.

FIG. 2 is a sequence diagram of an example of a process according to various embodiments of the present disclosure.

Referring to FIG. 2, in operation 201, each of a second electronic device 100-2 and a third electronic device 100-3 may transmit its file list to a first electronic device 100-1. The file list may indicate at least one of a file name, a file size, an extension, or a contents type of a file stored in each of the second and third electronic devices 100-2 and 100-3.

In operation 203, the first electronic device 100-1 may receive a user input selecting a source electronic device and a target file. In operation 205, the first electronic device 100-1 may receive a user input selecting a target electronic device. In operation 207, the first electronic device 100-1 may set the target file and the source electronic device according to the user input. For example, when a user selects a file stored in the third electronic device 100-3, the first electronic device 100-1 may designate the selected file as a target file (e.g., as a file that is to be transferred) and may designate the third electronic device 100-3 as the source electronic device. In operation 209, the first electronic device 100-1 may set the target electronic device according to the user input. For example, the first electronic device 100-1 may designate the second electronic device 100-2 as the target electronic device.

In operation 211, the first electronic device 100-1 may transmit a file transfer message to the second electronic device 100-2 (i.e., the target electronic device). In some implementations, the file transfer message may include an instruction for causing the target electronic device to retrieve the target file from the source electronic device.

According to an exemplary embodiment of the present disclosure, the file transfer message may include an instruction for causing the target electronic device to retrieve the target file from the source electronic device when a file transfer environment of each of the source electronic device and the target electronic device meets a predetermined criterion. For example, the criterion may pertain to the type of network which any of the source electronic device and the target device is connected to and/or a state of any of the target device and the source device. For example, the file transfer message may include an instruction for causing the target electronic device to retrieve a file when the target electronic device or the source electronic device connects to a wireless-fidelity (Wi-Fi) network. As another example, the file transfer message may include an instruction for causing the target electronic device to retrieve a file when the remaining capacity of a battery included in the target electronic device or the source electronic device is 20% or more. Therefore, the file may be reliably transmitted and received, and a network cost (e.g., a mobile communication fee) which may be incurred by transmitting and receiving a file may be minimized.

In operation 213, the second electronic device 100-2 may request the third electronic device 100-3, which is the source electronic device, to transfer a target file. In operation 215, the third electronic device 100-3 may transfer the request target file to the second electronic device 100-2.

In operation 217, the second electronic device 100-2 may transmit a file transfer state of the target file to the first electronic device 100-1. The file transfer state may include an indication of at least one of a transfer rate, a transfer quantity, a transfer progress ratio, whether to progress a transfer, a total estimated time, or a remaining time.

In operation 219, the first electronic device 100-1 may display the file transfer state. Therefore, the user may know the file transfer state such as the transfer rate and the transfer quantity.

In operation 221, the first electronic device 100-1 may receive a user input for stopping the transfer of a file. In operation 223, the first electronic device 100-1 may transmit a file transfer stop message to the second electronic device 100-2 in response to the input. In operation 225, the second electronic device 100-2 may request the third electronic device 100-3 to stop transferring the file. In operation 227, the third electronic device 100-3 may stop transferring the file according to the request of the second electronic device 100-2.

In operation 229, the first electronic device 100-1 may receive a user input for retransmitting the file. In operation 231, the first electronic device 100-1 may transmit a file retransmit message to the second electronic device 100-2. In operation 233, the second electronic device 100-2 may request the third electronic device 100-3 to transfer the file. In operation 235, the third electronic device 100-3 may retransmit the file, whose transfer was stopped to the second electronic device 100-2 in response to the request.

Figure 3:
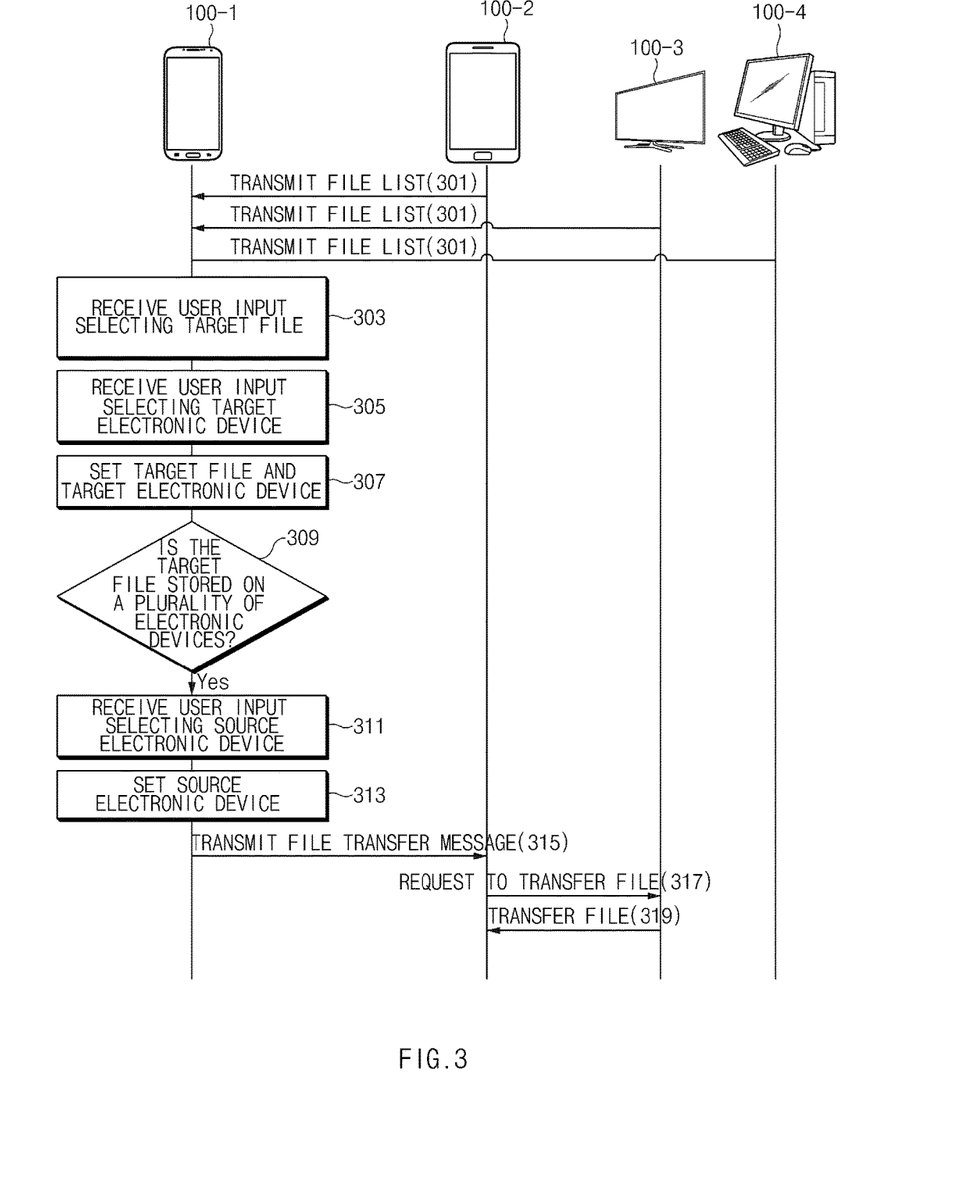
FIG. 3 is a sequence diagram of an example of a process according to various embodiments of the present disclosure.

FIG. 3 is a sequence diagram of an example of a process according to various embodiments of the present disclosure.

Referring to FIG. 3, in operation 301, each of a second electronic device 100-2, a third electronic device 100-3, and a fourth electronic device 100-4 may transmit its file list to a first electronic device 100-1. The file list may include information about at least one of a file name, a file size, an extension, or a contents type of a file stored in each of the second to fourth electronic devices 100-2 to 100-4.

In operation 303, the first electronic device 100-1 may receive a user input selecting a target file. In operation 305, the first electronic device 100-1 may receive a user input for selecting a target electronic device. In operation 307, the first electronic device 100-1 may set the target file and the target electronic device according to the user input. For example, the first electronic device 100-1 may designate the second electronic device 100-2 as the target electronic device.

In operation 309, the first electronic device 100-1 may determine whether the target file is stored on more than one device. According to an embodiment of the present disclosure, the first electronic device 100-1 may compare file lists of the first to fourth electronic devices 100-1 to 100-4 to determine whether there is a plurality of electronic devices that store the target file. For example, the first electronic device 100-1 may determine whether there is a file which has the same file name, extension, and file size.

When it is determined that the target file is stored on more than one device, in operation 311, the first electronic device 100-1 may receive a user input selecting a source electronic device from among the plurality of electronic devices that store the target file. According to an embodiment of the present disclosure, the first electronic device 100-1 may display a user interface (UI) identifying the plurality of electronic devices which store the target file as a source device. After the UI is displayed, the first electronic device 101 may receive, via the UI, a user input selecting one of the devices that store the target file as a source device. When the third electronic device 100-3 and the fourth electronic device 100-4 store the target file, the first electronic device 100-1 may display a UI for selecting one of the third electronic device 100-3 and the fourth electronic device 100-4 as the source device.

In operation 313, the first electronic device 100-1 may set the source electronic device according to the user input. For example, when the user selects the third electronic device 100-3, the first electronic device 100-1 may designate the third electronic device 100-3 as the source electronic device.

In operation 315, the first electronic device 100-1 may transmit a file transfer message to the second electronic device 100-2 which, in this example, is designated as the target electronic device. According to an embodiment of the present disclosure, the file transfer message may include an instruction for causing the target electronic device to retrieve the target file from the source electronic device.

According to an embodiment of the present disclosure, the file transfer message may include an instruction for causing the target electronic device to retrieve the target file from the source electronic device when a file transfer environment of each of the source electronic device and the target electronic device meets a predetermined criterion.

In operation 317, the second electronic device 100-2 may request the third electronic device 100-3, which is the source electronic device, to transfer a target file. In operation 319, the third electronic device 100-3 may transfer the requested target file to the second electronic device 100-2.

Figure 4:
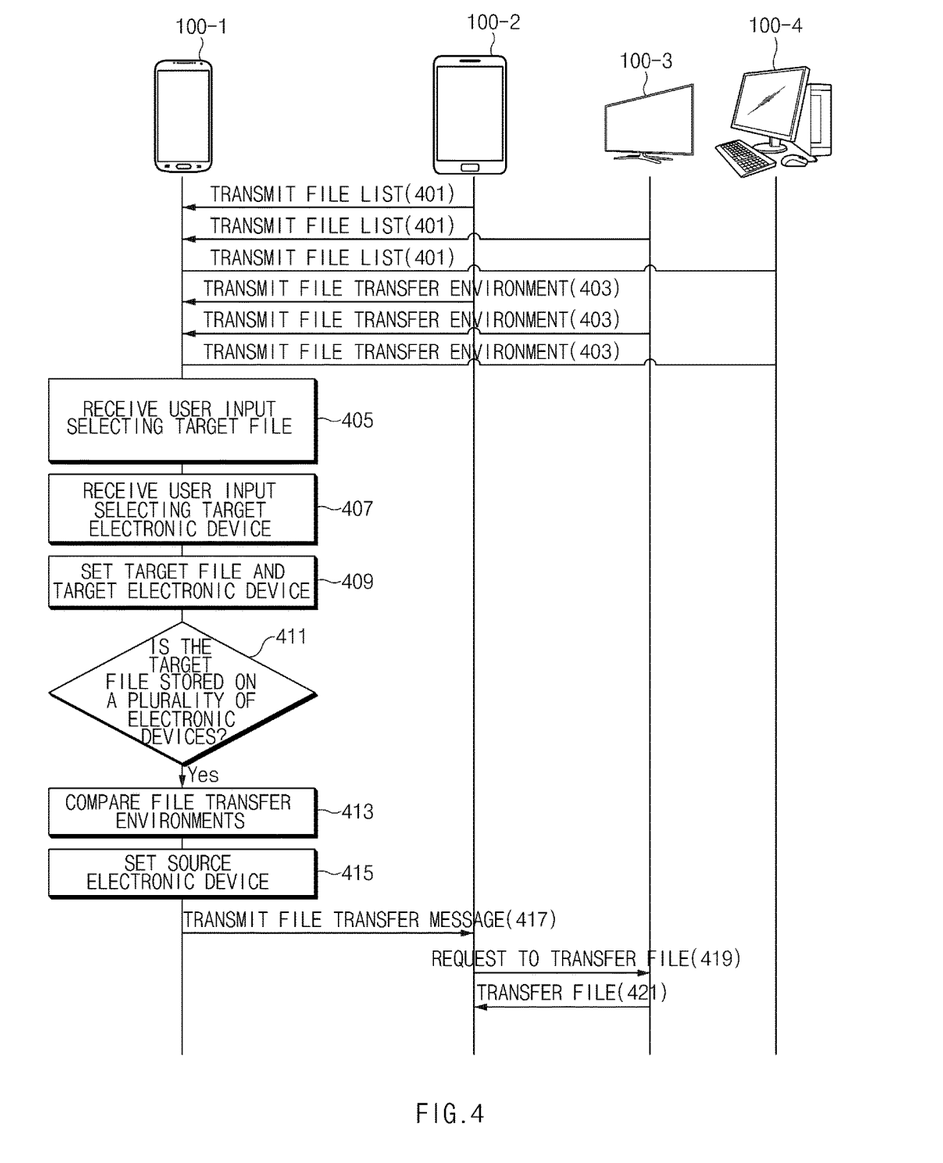
FIG. 4 is a sequence diagram of an example of a process according to various embodiments of the present disclosure.

FIG. 4 is a sequence diagram of an example of a process according to various embodiments of the present disclosure.

Referring to FIG. 4, in operation 401, each of the second electronic device 100-2, the third electronic device 100-3, and the fourth electronic device 100-4 may transmit its file list to the first electronic device 100-1. The file list may include an indication of at least one of a file name, a file size, an extension, or a contents type of a file stored in each of the second to fourth electronic devices 100-2 to 100-4.

In operation 403, each of the second electronic device 100-2, the third electronic device 100-3, and the fourth electronic device 100-4 may transmit an indication of its file transfer environment to the first electronic device 100-1. The indication of the respective file transfer environment of any of the devices may indicate at least one of a type of a network which the device is connected to, a transfer rate of the network, or a battery state of the device.

In operation 405, the first electronic device 100-1 may receive a user input selecting a target file. In operation 407, the first electronic device 100-1 may receive a user input selecting a target electronic device. In operation 409, the first electronic device 100-1 may set the target file and the target electronic device according to the user input. For example, the first electronic device 100-1 may designate the second electronic device 100-2 as the target electronic device.

In operation 411, the first electronic device 100-1 may determine whether the target file is stored on more than one device. In some implementations, the first electronic device 100-1 may compare file lists of the first to fourth electronic devices 100-1 to 100-4 to determine whether there is a plurality of electronic devices which store the target file. For example, the first electronic device 100-1 may determine whether there is a file which has the same file name, extension, and file size.

When it is determined that there is the plurality of electronic devices which store the target file, in operation 413, the first electronic device 100-1 may compare file transfer environments of the plurality of electronic devices which store the target file. In operation 415, the first electronic device 100-1 may set the source electronic device according to the result of comparing the file transfer environments.

According to an embodiment of the present disclosure, the first electronic device 100-1 may compare the types of the respective networks of the electronic devices which store the target file and may designate an electronic device, which incurs a low network cost, as the source electronic device. For example, when the third electronic device 100-3 is connected to a Wi-Fi network and when the fourth electronic device 100-4 is connected to a mobile communication network such as a 3 generation (3G) network or a long-term evolution (LTE) network, the first electronic device 100-1 may designate the third electronic device 100-3 as the source electronic device. As another example, when the third electronic device 100-3 is connected to the same Wi-Fi network as that of a target electronic device and when the fourth electronic device 100-4 is connected to a different Wi-Fi network from that of the target electronic device, the first electronic device 100-1 may designate the third electronic device 100-3 as the source electronic device.

According to an embodiment of the present disclosure, the first electronic device 100-1 may compare battery states of the plurality of electronic devices which store the target file and may designate an electronic device, which has the highest remaining battery capacity, as the source electronic device.

In operation 417, the first electronic device 100-1 may transmit a file transfer message to the second electronic device 100-2 (i.e., target electronic device). According to an embodiment of the present disclosure, the file transfer message may include an instruction for causing the target electronic device to retrieve a target file from the source electronic device. Additionally or alternatively, in some implementations, the control instruction may instruct the target electronic device to retrieve the target file only when the file transfer environment of one of the target electronic device or the source electronic device meets a predetermined criterion.

In operation 419, the second electronic device 100-2 may request the third electronic device 100-3, which is the source electronic device, to transfer a target file. In operation 421, the third electronic device 100-3 may transfer the requested target file to the second electronic device 100-2.

Figure 5:
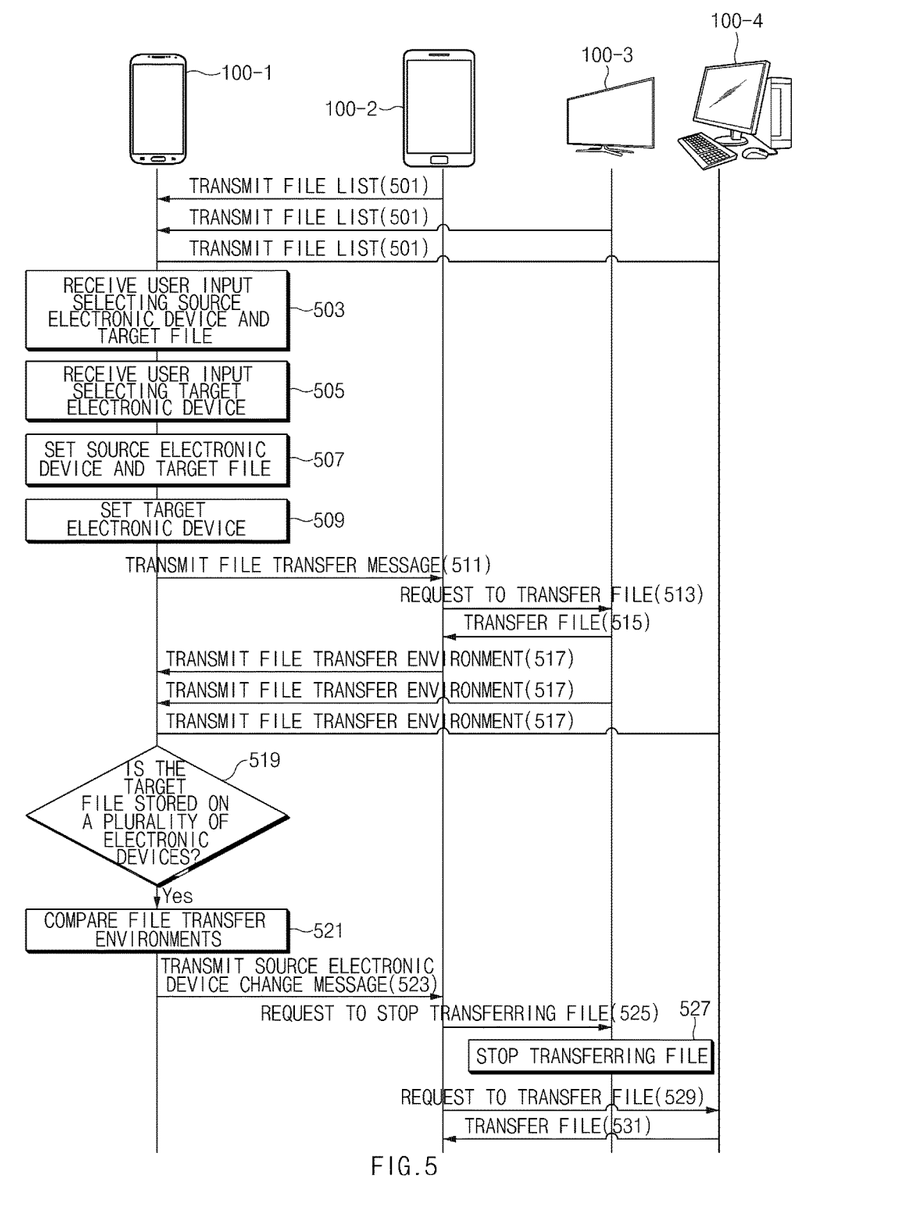
FIG. 5 is a sequence diagram of an example of a process according to various embodiments of the present disclosure.

FIG. 5 is a sequence diagram of an example of a process according to various embodiments of the present disclosure.

Referring to FIG. 5, in operation 501, each of a second electronic device 100-2, a third electronic device 100-3, and a fourth electronic device 100-4 may transmit its file list to a first electronic device 100-1. The file list may include information about at least one of a file name, a file size, an extension, or a contents type of a file stored in each of the second to fourth electronic devices 100-2 to 100-4.

In operation 503, the first electronic device 100-1 may receive a user input selecting a source electronic device and a target file. In operation 505, the first electronic device 100-1 may receive a user input selecting a target electronic device. In operation 507, the first electronic device 100-1 may set the target file and the source electronic device according to the user input. For example, when a user selects a file stored in the third electronic device 100-3, the first electronic device 100-1 may sets the selected file as a target file and may designate the third electronic device 100-3 as the source electronic device. In operation 509, the first electronic device 100-1 may set the target electronic device according to the user input. For example, the first electronic device 100-1 may designate the second electronic device 100-2 as the target electronic device.

In operation 511, the first electronic device 100-1 may transmit a file transfer message to the target electronic device (e.g., device 100-2). According to an embodiment of the present disclosure, the file transfer message may include an instruction for causing the target electronic device to retrieve the target file from the source electronic device.

Additionally or alternatively, in some implementations, the control instruction may instruct the target electronic device to retrieve the target file only when the file transfer environment of one of the target electronic device or the source electronic device meets a predetermined criterion. The file transfer environment may include information about at least one of a kind of a network currently connected to the source electronic device or the target electronic device, a transfer rate of the network, or a battery state of the source electronic device or the target electronic device. For example, the file transfer message may include an instruction for causing the target electronic device to retrieve a file when the target electronic device or the source electronic device connects to a Wi-Fi network. As another example, the file transfer message may include an instruction for causing the target electronic device to retrieve a file when the remaining capacity of a battery of the target electronic device or the source electronic device is 20% or more.

In operation 513, the second electronic device 100-2 may request the third electronic device 100-3 to transfer the target file. In operation 515, the third electronic device 100-3 may transfer the requested target file to the second electronic device 100-2.

In operation 517, each of the second electronic device 100-2, the third electronic device 100-3, and the fourth electronic device 100-4 may transmit an indication of its file transfer environment to the first electronic device 100-1. The indication of the file transfer environment may indicate at least one of the type of a network connecting the second, third, and fourth electronic devices to one another, a transfer rate of the network, or a battery state of any of the second, third, and fourth electronic devices.

In operation 519, the first electronic device 100-1 may determine whether there the target file is stored on more than one device. According to an embodiment of the present disclosure, the first electronic device 100-1 may compare file lists of the first to fourth electronic devices 100-1 to 100-4 to determine whether there is a plurality of electronic devices which store the target file. For example, the first electronic device 100-1 may determine whether there is a file which has the same file name, extension, and file size. Alternatively, in some implementations, the first electronic device may determine whether the target file is stored on more than one device that meets a predetermined criterion and treat only the electronic devices that store the target file and meet the criterion as potential source devices.

When it is determined that the target file is stored on a plurality of devices, in operation 521, the first electronic device 100-1 may compare file transfer environments of the plurality of electronic devices which store the target file. In operation 523, the first electronic device 100-1 may transmit a source electronic device change message to the target electronic device (i.e., the electronic device 100-2) according to the result of comparing the file transfer environments. According to an embodiment of the present disclosure, the source electronic device change message may include an instruction which when executed by the target electronic device causes the target electronic device to retrieve the target file from an electronic device that is different from an electronic device that has been previously designated as a source device (e.g. a changed source electronic device).

According to an embodiment of the present disclosure, the first electronic device 100-1 may compare file transfer environments of the plurality of electronic devices which store the target file and may set the source electronic device. When the electronic device whose file transfer environment satisfies a predetermined criterion is different from an old source electronic device, the first electronic device 100-1 may transmit the source electronic device change message to the second electronic device 100-2.

According to an embodiment of the present disclosure, the first electronic device 100-1 may compare the types of the networks connected with the plurality of electronic devices which store the target file and may designate an electronic device, which incurs a low network cost, as the source electronic device. For example, when the third electronic device 100-3 connects to a mobile communication network after a Wi-Fi network connection to the third electronic device 100-3 is blocked and when the fourth electronic device 100-4 connects to a Wi-Fi network, the first electronic device 100-1 may designate the fourth electronic device 100-4 as a new source electronic device.

According to an embodiment of the present disclosure, the first electronic device 100-1 may compare battery states of the plurality of electronic devices which store the target file and may designate an electronic device, which has the highest remaining battery charge as the source device.

In operation 525, the second electronic device 100-2 may request the third electronic device 100-3, (hereinafter "old source electronic device"), to stop transferring the target file. In operation 527, the third electronic device 100-3 may stop transferring the target file to the second electronic device 100-2.

In operation 529, the second electronic device 100-2 may request the fourth electronic device 100-4, which is the new source electronic device, to transfer the target file. In operation 531, the fourth electronic device 100-4 may transmit the requested target file to the second electronic device 100-2.

According to the embodiment of the present disclosure described with reference to FIG. 5, after the first electronic device 100-1 transmits the file transfer message, although the Wi-Fi network connection to the source electronic device is blocked or although the file transfer environment deteriorates due to insufficient battery capacity, the target electronic device may reliably receive the target file from another source electronic device.

Figure 6:
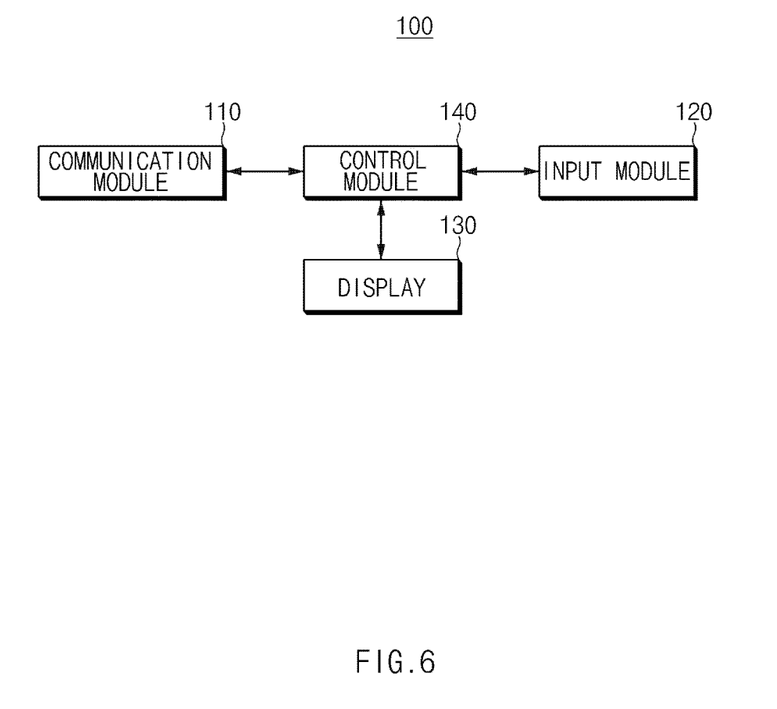
FIG. 6 is a block diagram of an example of an electronic device according to an embodiment of the present disclosure.

FIG. 6 is a block diagram of an example of an electronic device according to an embodiment of the present disclosure. Particularly, FIG. 6 is a drawing illustrating a configuration of an electronic device when the electronic device operates as a management electronic device.

Referring to FIG. 6, an electronic device 100 may include a communication module 110, an input module 120, a display 130, and a control module 140.

The communication module 110 may communicate with another electronic device and a server 200 of FIG. 1 over a network. For example, the communication module 110 may connect to other electronic devices and the server 200 over any suitable type of communications network, such as the Internet, a mobile communication network, or a local area wireless communication network (e.g., a Wi-Fi network, a Bluetooth network, and the like).

The communication module 110 may transmit a file list, a file transfer environment, or a file transfer state of the electronic device 100 to a plurality of electronic devices or the server 200, which are connected to the electronic device 100 over the network and may receive a file list, a file transfer environment, or a file transfer state of each of the plurality of electronic devices. The file list may include information about at least one of a file name, a file size, an extension, or a contents type of a file stored in the electronic device 100 or each of the plurality of electronic devices. The file transfer environment may include information about at least one of the type of a network currently connecting the electronic device 100 with any of the plurality of electronic devices, a transfer rate of the network, or a battery state of the electronic device 100 or each of the plurality of electronic devices. The file transfer state may include information about at least one of a transfer rate, a transfer quantity, a transfer progress ratio, whether to progress a transfer, a total estimated time, or a remaining time.

According an embodiment of the present disclosure, the communication module 110 may transmit a file transfer message, a file transfer stop message, a file retransmit message or a source electronic device change message under control of the control module 140.

The input module 120 may be arranged to receive user input. For example, the input module 120 may receive a user input selecting a source electronic device, a target file, and a target electronic device. Alternatively, when the target file is stored on more than one electronic device, the input module 120 may receive a user input selecting one of the plurality of electronic devices. Alternatively, the input module 120 may receive a user input requesting to stop transferring a file or to retransmit a file.

According to an embodiment of the present disclosure, for this purpose, the input module 120 may include at least one of a touch screen or a touch pad which operates by a touch input of a user, a keypad or a keyboard which has various function keys, numeric keys, special keys, character keys, and the like, a remote controller, a mouse, a motion recognition sensor which recognizes motion of the user, and a voice recognition sensor which recognizes a voice of the user.

According to an embodiment of the present disclosure, the input module 120 may be implemented in various ways according to a kind of the electronic device 100 and characteristics of the electronic device 100. For example, when the electronic device 100 is a smartphone, the input module 120 may include a touch screen or a voice recognition sensor. When the electronic device 100 is a television (TV), the input module 120 may include a remote controller, a motion recognition sensor, or a voice recognition sensor. Alternatively, when the electronic device 100 is a notebook PC, the input module 120 may include a keypad or a touch pad. Alternatively, when the electronic device 100 is a camera, the input module 120 may include a keypad or a touch pad.

The display 130 may display an image or a user interface (UI). For example, the display 130 may display a UI for selecting a source electronic device, a target file, and a target electronic device. Alternatively, when the target file is stored on more than one electronic device, the display 130 may display a UI for selecting one of the plurality of electronic devices which store the target file. Alternatively, when another electronic device other than an electronic device selected by the user is designated as a source electronic device, the display 130 may display a UI for providing notification that the source electronic device is changed. Alternatively, the display 130 may display a file transfer state of a source electronic device or a target electronic device.

The control module 140 may include any suitable type of processing circuitry, such as one or more general purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. The control module 140 may control an overall operation of the electronic device 100. The control module 140 may control each of the communication module 110, the input module 120, and the display 130 to control or manage a file transfer according to various embodiments of the present disclosure.

According to an embodiment of the present disclosure, the control module 140 may set the source electronic device, the target file, and the target electronic device. For example, the control module 140 may set the source electronic device, the target file, and the target electronic device according to user input.

According to an embodiment of the present disclosure, the control module 140 may determine whether there is a plurality of electronic devices which store a target file when the target file is set. According to an embodiment of the present disclosure, the control module 140 may compare file lists of the plurality of electronic devices connected to the electronic device 100 over a network and may determine whether the target file is available on more than one device. For example, the control module 140 may determine whether there is a file which has the same file name, extension, and file size.

When it is determined that the target file is stored on more than one electronic device, the control module 140 may designate one of the devices that store the target file as a source electronic device.

According an embodiment of the present disclosure, when a user input selecting one of the plurality of electronic devices which store the target file is received, the control module 140 may designate the electronic device selected by the user as a source electronic device.

According to an embodiment of the present disclosure, the control module 140 may compare file transfer environments of the plurality of electronic devices which store the target file and may designate one of the plurality of electronic devices as a source electronic device according to the outcome of the comparison. For example, the control module 140 may compare kinds of networks connected to the plurality of electronic devices which store the target file and may designate an electronic device, which incurs a low network cost, as a source electronic device. As another example, the control module 140 may compare battery states of the plurality of electronic devices which store the target file and may designate an electronic device, which has the high remaining capacity of a battery, as a source electronic device.

According to an embodiment of the present disclosure, the control module 140 may control the communication module to transmit a file transfer message to a designated target electronic device. According to an embodiment of the present disclosure, the file transfer message may include an instruction for causing the target electronic device to retrieve a target file from a source electronic device. According to an embodiment of the present disclosure, the file transfer message may include an instruction for causing the target electronic device to retrieve the target file from the source electronic device when a file transfer environment of each of the source electronic device and the target electronic device meets a predetermined standard. For example, the file transfer message may include an instruction for causing the target electronic device to retrieve a file when the target electronic device or the source electronic device connects to a Wi-Fi network. As another example, the file transfer message may include an instruction for causing the target electronic device to retrieve a file when the remaining capacity of a battery of the target electronic device or the source electronic device is 20% or more.

According to an embodiment of the present disclosure, the control module 140 may control the communication module 110 to transmit a file transfer stop message or a file retransmit message to the target electronic device according to a user input.

According to an embodiment of the present disclosure, when it is determined that there are the plurality of electronic devices which store the target file, the control module 140 may transfer a file transfer message, may compare file transfer environments of the plurality of electronic devices which store the target file, and may control the communication module 110 to transmit a source electronic device change message to the target electronic device according to the compared result. According to an embodiment of the present disclosure, the control module 140 may compare kinds of networks connected with the plurality of electronic devices which store the target file and may designate an electronic device, which incurs a low network cost, as the source electronic device. According to an embodiment of the present disclosure, the control module 140 may compare battery states of the plurality of electronic devices which store the target file and may designate an electronic device, which has the high remaining capacity of a battery, as the source electronic device. When the source electronic device is changed, the control module 140 may control the communication module 110 to transmit a source electronic device change message to the target electronic device. According to an embodiment of the present disclosure, the source electronic device change message may include an instruction for causing the target electronic device to retrieve a target file from a changed source electronic device.

The electronic device according to various embodiments of the present disclosure may include a communication module configured to receive a file list of each of a plurality of electronic devices connected with the electronic device over a network, an input module configured to receive a user input selecting a source electronic device, a target file, and a target electronic device, and a control module configured to set the source electronic device, the target file, and the target electronic device and to control the communication module to transmit a file transfer message to the set target electronic device. The file transfer message may include an instruction for controlling the target electronic device to receive the target file from the source electronic device.

Figure 7:
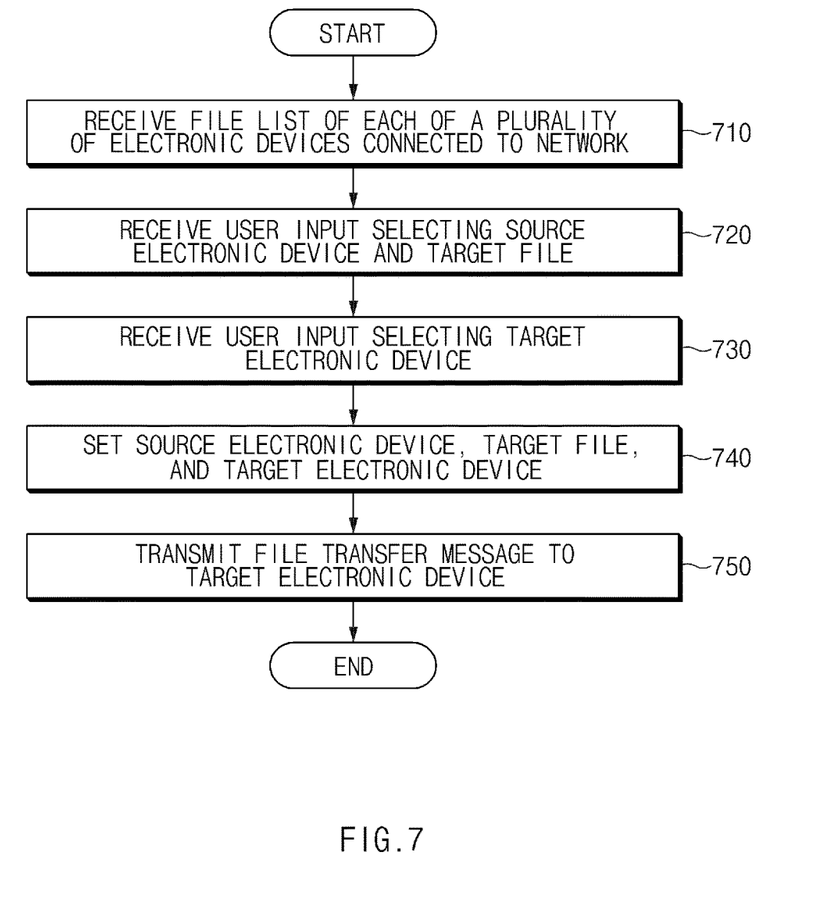
FIG. 7 is a flowchart of an example of a process according to an embodiment of the present disclosure.

FIG. 7 is a flowchart of an example of a process according to an embodiment of the present disclosure. FIG. 7 is a flowchart illustrating a file transfer managing method of an electronic device, including operations performed by the electronic device shown in FIG. 6. Referring to FIG. 7, in operation 710, an electronic device 100 of FIG. 6 may receive a respective file list from each of a plurality of electronic devices. The file list may include an indication of at least one of a file name, a file size, an extension, or a contents type of a file stored in each of the plurality of electronic devices. According to an embodiment of the present disclosure, one or more of the file lists may be received from a server 200. According to an embodiment of the present disclosure, the electronic device 100 may receive an indication of a file transfer environment of each of the plurality of electronic devices as well as the file list. The indication of the file transfer environment may include an indication of at least one the type of a network currently connecting the plurality of electronic devices, a transfer rate of the network, or a battery state of each of the plurality of electronic devices.

In operation 720, the electronic device 100 may receive a user input selecting a source electronic device and a target file. In operation 730, the electronic device 100 may receive a user input selecting a target electronic device.

In operation 740, the electronic device 100 may set the source electronic device, the target file, and the target electronic device. According to an embodiment of the present disclosure, the electronic device 100 may set the source electronic device, the target file, and the target electronic device according to the user input.

According to an embodiment of the present disclosure, when there the target file is available on a plurality of electronic devices, the electronic device 100 may receive a user input selecting one of the plurality of electronic devices and may designate the selected electronic device as the source electronic device.

According to an embodiment of the present disclosure, when there are the plurality of electronic devices which store the target file, the electronic device 100 may compare file transfer environments of the plurality of electronic devices which store the target file and may designate one of the plurality of electronic devices as the source electronic device according to the outcome of the comparison. For example, the electronic device 100 may compare kinds of networks connected with the plurality of electronic devices which store the target file and may designate an electronic device, which incurs a low network cost, as the source electronic device. As another example, the electronic device 100 may compare battery states of the plurality of electronic devices which store the target file and may designate an electronic device, which has the highest remaining battery capacity, as the source electronic device. When source electronic device that is automatically designated based on the comparison is different from the electronic device which the user has selected to act as a source electronic device, the electronic device 100 may provide notification that the user's selection has been overridden. For example, the electronic device 100 may display a UI for providing notification that the user selection of a source electronic device has been overridden.

In operation 750, the electronic device 100 may transmit a file transfer message to the target electronic device. According to an embodiment of the present disclosure, the file transfer message may include an instruction for causing the target electronic device to retrieve a target file from the source electronic device. According to an embodiment of the present disclosure, the file transfer message may include an instruction for causing the target electronic device to retrieve the target file from the source electronic device when a file transfer environment of each of the source electronic device and the target electronic device meets a predetermined criterion.

According to an embodiment of the present disclosure, after transmitting the file transfer message, the electronic device 100 may receive an indication of a file transfer state of the source electronic device or the target electronic device. When receiving the file transfer state, the electronic device 100 may display the indication of the file transfer state of the source electronic device or the target electronic device. In this way, the user may be informed of e the file transfer state in real time between other electronic devices.

According to an embodiment of the present disclosure, the electronic device 100 may transmit a file transfer stop message or a file retransmit message to the target electronic device according to a user input.

According to an embodiment of the present disclosure, when it is determined that there are plurality of electronic devices which store the target file, the electronic device 100 may transmit the file transfer message, may compare file transfer environments of the plurality of electronic devices which store the target file, and may control a communication module to transmit a source electronic device change message to the target electronic device according to the outcome of the comparison. According to an embodiment of the present disclosure, the source electronic device change message may include an instruction for causing the target electronic device to retrieve a target file from a changed source electronic device.

According to various embodiments of the present disclosure, the file transfer managing method of the electronic device may include receiving a file list of each of a plurality of electronic devices connected to the electronic device over a network, receiving a user input selecting a source electronic device and a target file, receiving a user input selecting a target electronic device to receive the target file, setting the source electronic device, the target file, and the target electronic device, and transmitting a file transfer message to the target electronic device. The file transfer message may include an instruction for causing the target electronic device to retrieve the target file from the source electronic device.

According to various embodiments of the present disclosure, a method for providing an internet protocol multimedia subsystem (IMS) service in a main electronic device may be implemented with a program which may be executed in the electronic device. This program may be stored and used in various recording media.

Specifically, program codes for performing the above-described methods may be stored in various non-volatile recording media, such as a flash memory, a read-only memory (ROM), an erasable programmable ROM (EPROM), an electrically erasable and programmable ROM (EEPROM), a hard disc, a removable disc, a memory card, a universal serial bus (USB) memory, and a compact disc-ROM (CD-ROM).

According to various embodiments of the present disclosure, a computer readable medium having embodied thereon a program for executing a file transfer managing method. The method may include receiving a file list of each of a plurality of electronic devices connected over a network, receiving a user input selecting a source electronic device and a target file, receiving a user input selecting a target electronic device to receive the target file, setting the source electronic device, the target file, and the target electronic device, and transmitting a file transfer message to the designated target electronic device. The file transfer message may include an instruction for causing the target electronic device to retrieve the target file from the source electronic device.

According to various embodiments of the present disclosure, the electronic device may transmit and receive a file between electronic devices a user does not have, may reliably transmit and receive the file by addressing an issue which may occur upon transmitting and receiving the file, and may minimize a network cost.

FIGS. 1-7 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device comprising:
a communication circuit;
an input device;
a display; and
at least one processor configured to:
   receive, via the communication circuit, a respective file list of a plurality of external electronic devices;
   display, on the display, a user interface for selecting a source electronic device, a target file, and a target electronic device based on the respective file list of each of the plurality of external electronic devices;
   detect, via the input device, an input to the user interface that selects the target file, a first external electronic device from the plurality as the source electronic device and a second external electronic device from the plurality as the target electronic device;
   designate directly the target file based on the file list, and the first external electronic device as the source device and the second external electronic device as the target electronic device based on the input; and
   transmit, via the communication circuit, a file transfer message directly to the target electronic device, wherein the file transfer message comprises an instruction to retrieve the target file from the source electronic device.

2. The electronic device of claim 1, wherein the at least one processor is further configured to:
display, on the display, a user interface identifying those external electronic devices from the plurality that store the target file; and
detect, via the input device, an input to the user interface that selects the second external electronic device as the source electronic device.

3. The electronic device of claim 1, wherein:
the at least one processor is further configured to, for each external electronic device in the plurality, receive an indication of a file transfer environment characteristic of that external electronic device;
designate directly a third external electronic device as a new source electronic device based on an outcome of a comparison between the file transfer environment characteristic of the plurality of external electronic devices; and transmit a source electronic device change message directly to the target electronic device, wherein the source electronic device change message comprises an instruction to retrieve the target file from the new source electronic device.

4. The electronic device of claim 3, wherein the at least one processor is further configured to output a notification that a user selection of the source electronic device is overridden based on the outcome of the comparison.

5. The electronic device of claim 3, wherein the respective file transfer environment characteristic of a given external electronic device from the plurality includes at least one of a type of a network to which the given external electronic device is connected, a transfer rate of the network, and a remaining battery charge of the given external electronic device.

6. The electronic device of claim 1,
wherein the at least one processor is further configured to, for each external electronic device in the plurality, receive an indication of a file transfer environment characteristic of that external electronic device,
designate a third external electronic device from the plurality as a changed source electronic device based on an outcome of a comparison between the file transfer environment characteristic of the plurality of external electronic devices, and
transmit, via the communication circuit, a source electronic device change message to the target electronic device, wherein the source electronic device change message comprises an instruction to retrieve the transfer file from a changed source electronic device.

7. The electronic device of claim 1, wherein the file transfer message is transmitted in response to a file transfer environment of one of the source electronic device and the target electronic satisfying a predetermined criterion.

8. The electronic device of claim 1, wherein the at least one processor is further configured to display, on the display, an indication of a file transfer state that is received from one of the source electronic device and the target electronic device after file transfer message is transmitted.

9. The electronic device of claim 1, wherein the at least one processor is further configured to transmit a file transfer stop message or a file retransmit message to the target electronic device in response to an input that is detected by using the input device.

10. A method comprising:
receiving, by at least one processor, a respective file list of a plurality of external electronic devices;
displaying, on a display, a user interface for selecting a source electronic device, a target file, and a target electronic device based on the respective file list of each of the plurality of external electronic devices;
detecting, via an input device, an input to the user interface that selects the target file, a first external electronic device from the plurality as the source electronic device and a second external electronic device from the plurality as the target electronic device;
designating directly the target file based on the file list, and the first external electronic device as the source device and the second external electronic device as the target electronic device based on the input; and
transmitting, by a communications circuit, a file transfer message directly to the target electronic device, wherein the file transfer message comprises an instruction to retrieve the target file from the source electronic device.

11. The method of claim 10, wherein the designating of the source electronic device comprises:
displaying, on the display, a user interface identifying those external electronic devices from the plurality that store the target file; and
detecting an input to the user interface that selects the second external electronic device as the source electronic device.

12. The method of claim 10, further comprising:
for each external electronic device in the plurality, receiving an indication of a file transfer environment characteristic of that external electronic device,
designating directly a third external electronic device as a new source electronic device based on an outcome of a comparison between the file transfer environment characteristic of the plurality of external electronic devices; and
transmitting a source electronic device change message directly to the target electronic device, wherein the source electronic device change message comprises an instruction to retrieve the target file from the new source electronic device.

13. The method of claim 12, further comprising outputting a notification that a user selection of the source electronic device is overridden based on the outcome of the comparison.

14. The method of claim 12, wherein the respective file transfer environment characteristic of a given external electronic device from the plurality includes at least one of a type of a network to which the given external electronic device is connected, a transfer rate of the network, and a remaining battery charge of the given external electronic device.

15. The method of claim 10, further comprising:
for each external electronic device in the plurality, receiving an indication of a file transfer environment characteristic of that external electronic device,
designating a third external electronic device from the plurality as a changed source electronic device based on an outcome of a comparison between the file transfer environment characteristic of the plurality of external electronic devices, and
transmitting, by the communication circuit, a source electronic device change message to the target electronic device, wherein the source electronic device change message comprises an instruction to retrieve the transfer file from a changed source electronic device.

16. The method of claim 10, wherein the file transfer message is transmitted in response to a file transfer environment of one of the source electronic device and the target electronic satisfying a predetermined criterion.

17. The method of claim 10, further comprising outputting an indication of a file transfer state that is received from one of the source electronic device and the target electronic device after file transfer message is transmitted.

18. The method of claim 17, further comprising transmitting a file transfer stop message or a file retransmit message to the target electronic device in response to detecting a predetermined input.

19. A non-transitory computer-readable medium storing a plurality of processor-executable instructions which when executed by at least one processor cause the processor to perform a method comprising:

receiving, by at least one processor, a respective file list of a plurality of external electronic devices;

displaying, on a display, a user interface for selecting a source electronic device, a target file, and a target electronic device based on the respective file list of each of the plurality of external electronic devices;

detecting, via an input device, an input to the user interface that selects the target file, a first external electronic device from the plurality as the source electronic device and a second external electronic device from the plurality as the target electronic device;

designating directly the target file based on the file list, and the first external electronic device as the source device and the second external electronic device as the target electronic device based on the input; and transmitting, by a communications circuit, a file transfer message directly to the target electronic device, wherein the file transfer message comprises an instruction to retrieve the target file from the source electronic device.

* * * * *